Patented Nov. 11, 1947

2,430,726

UNITED STATES PATENT OFFICE 2,430,726

HEAT SEALING MOISTUREPROOFING COATINGS

James A. Mitchell, Kenmore, N. Y., assignor to E. I. du Pont de Nemours & Company, Wilmington, Del., a corporation of Delaware No Drawing. Application February 14, 1942, Serial No. 430,885

4 Claims. (Cl. 117—146)

This invention relates to moisture-resistant sheet wrapping material, especially moistureproofed transparent non-fibrous sheet. More particularly it appertains to age-resistant heat sealable moistureproofing coatings on films of regenerated cellulose and the like.

One of the newer sheet wrapping materials consists of a thin cellulosic base sheet having a moistureproofing coating. The manufacture of typical base sheet (film, foil, pellicle, skin, tissue, web) is described in U. S. A. Patents 1,548,864 (Brandenberger), and 2,123,883 (Ellsworth). Representative coating compositions and the application thereof are set out in U. S. A. Patents 1,737,187 (Charch and Prindle), 1,826.697-8 (Charch and Craigue), 2,042,589 (Charch and Hershberger), 2,147,180 (Ubben), 2,159,151 (Hershberger), 2,169,366 (Meigs) and 2,201,747 (Staudt).

The coating is usually a continuous, unbroken layer comprising essentially moistureproofing material (material which does not dissolve more than an infinitesimal amount of, if any water), for example, a waxy (wax-like) substance such as paraffin wax, and a cementing (binding, filmforming) material therefor, for example, cellulose nitrate.

To improve the properties, inter alia, flexibility, of the coating, plasticizing material, for example dibutyl phthalate, is generally incorporated therein. The base sheet as produced usually contains softening material, for example glycerol, and has, therefore, adequate pliability.

To overcome any haziness which might result from some proportions and combinations of other components of the coating, transparentizing (blending, homogenizing) material, for example, resins and gums such as Damar and ester gum, is ordinarily included.

The present state of the moistureproofing art, to which reference is made for conventional details in the interest of brevity, is indicated by U. S. A. Patents Nos. 1.826,696 (Charch and Prindle), 1,962,338 (Charch), 1,972,869 (Charch, Hyden and Siemann), 1,989,681 (Charch), 1,990,080 (Leach and Siemann), 1,997,583 (Hitt), 1,997,857 (Charch), 2,022,490 (Charch), 2,030,962 (Charch, Hyden and Siemann), 2,042,638 (Siemann), 2,061,374 (Charch), 2,064,292 (Charch), 2,065,792 (Charch), 2,077,396 (Charch and Hershberger), 2,077,399 (Collins and Larson), 2,077,400 (Collins), 2,079,379 (Mitchell), 2,079,395 (Bradshaw), 2,085,816 (Meigs), 2,087,013 (Bateman), 2,094,771 (Charch and Hershberger), 2,096,122 (Maney), 2,098,534-542 (Charch, Brubaker and Meigs), 2,100,377 (Brubaker), 2,122,418 (Gladding and Maney), 2,122,433 (Meigs), 2,137,636 (Barrett), 2,144,383 (Meigs), 2,147,628 (Charch), 2,147,629 (Charch), 2,159,007 (Charch and Bateman), 2,177,645 (Flint and Mitchell), 2,192,314 (Izard and Mitchell), 2,193.831 (Mitchell), 2,205,210 (Latour), 2,205,428 (Mitchell), 2,209,965 (Finzel), 2,213.252 (Mitchell), 2,216,812 (Flint), and 2,234,565 (Lanning).

In spite of the many desirable properties of ordinary moistureproof transparent regenerated cellulose film, its usefulness in some fields, for example, where heat sealing is required, is severely circumscribed. Sealing package wrappers by means of heat and pressure is one of the commonest and simplest methods known and employed, and it will be obvious, therefore, that a wrapping material not capable of being so sealed is at a considerable disadvantage. Extensive research has been and is being carried out, with the object of improving the heat sealing characteristics of moistureproof transparent sheet.

Holt (U. S. A. patent application Serial No. 302,323, filed November 1, 1939) has proposed that iratol (a hard brittle resin-like material having a reddish-black color en masse, made by treating beta naphthol with rubber) be employed as the cementing agent in this type of coating in order to produce better heat seals. The seals are initially very good, but they weaken rapidly. Deterioration of the heat seal is sometimes so complete that the package wrapper loosens and moisture gains access to the package contents through the section of the wrapper embodying the seal. In addition, the coating discolors rapidly, particularly when subjected to sunlight or heat, to such an extent that packages embodying the same are not commercially acceptable. This last is a reasonable objection because discoloration of the wrapper suggests to the consumer that foodstuffs and related materials so wrapped are not in the best of condition.

It has now been found that color formation in moistureproofing coatings employing iratol as the cementing agent, can be restrained (avoided, prevented, inhibited, curbed, repressed, obviated), and the products embodying the same stabilized and their life very greatly lengthened, by incorporating therein (compounding with, diluting with) N:N:N′:N′-tetra-ethyl- 4:4′-di-amino-di-phenyl methane and similar substances. These substances are comprehended by the general structural formula:

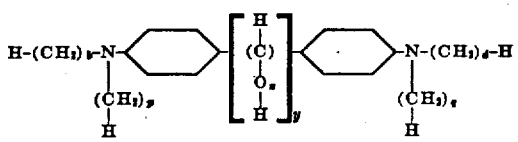

in which $b$, $d$, $p$ and $q$ are numerals from the group consisting of 0, 1 and 2, and $x$ and $y$ are numerals from the group consisting of 0 and 1.

The primary object of this invention was to provide improved moistureproofing and moisture-resisting coatings for Cellophane (regenerated cellulose). Other objects were to improve heat sealable moistureproofing coatings, to lengthen the life of heat sealable coatings containing iratol, to stabilize iratol against deterioration from age, to prevent the formation of color in moistureproofing coatings and the like containing iratol, and to devise heat sealing processes and compositions which would give heat seals having a long life. A general advance in the art, and other objects which will appear hereinafter, are also contemplated.

How the foregoing objects and related ends are accomplished will be apparent from the following exposition, in which are disclosed the principle and divers embodiments of the invention, including the best mode contemplated for carrying out the same. Parts are given by weight throughout the application unless otherwise specified.

Comparative heat seal strengths appear to be the most satisfactory way of showing the effectiveness (stabilizing effect) of the diamino diphenyl methanes in iratol. A standard heat seal strength test (U. S. A. Patent No. 2,147,180 to Ubben) was used to secure the data in the examples which follow. In this test two strips of the coated material (in this case regenerated cellulose sheeting) 1.5 inches wide are superimposed one on the other so that opposite faces of the material are in contact. A seal is made across the width of the material at one end by placing the material on a metal plate heated to 130° C., and rolling thereover a roller ⅝ inch wide weighted to 650 grams. The two strips so sealed are separated at the end where they are unsealed and placed in a stretching device such as a Suter testing machine. By gripping the free ends of the strips in suitable clamps, one of which is fixed while the other is moved away at a constant speed of 12 inches per minute, and measuring the force applied, the desired data is obtained. The force in grams required to pull the sheets apart is taken as a measure of the heat seal bond strength.

*Example I*

Prepare a moistureproofing coating composition by dissolving a mixture of 90 parts iratol (Example X of U. S. A. Patent 2,158,530 type), 10 parts paraffin wax (M. P. 60° C.) and 2 parts of N:N:N′:N′-tetraethyl - 4:4′ - diamino diphenyl methane in sufficient toluene to give a 12% solids dispersion. Pass a sheet of regenerated cellulose approximately 0.00088 of an inch thick through this lacquer. Remove the solution in excess of that required to leave on each side a coat 0.0005 inch thick, from the surface by means of doctor knives and introduce the coated sheet into a drier through which air is circulating. Raise the temperature rapidly and dry the coating at a temperature approximately equal to the melting point of the wax. The material so produced will be highly transparent, flexible, moistureproof and heat sealable, and will exhibit no degradation of moistureproofness after a period of one week from the time of coating. It will have an initial heat seal value of 250 which will remain constant for over a week when heated at 95° C.

*Example II*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| N:N:N′:N′-tetramethyl - 4:4′ - diamino diphenyl methane | 2 | to a regenerated cellulose sheet in the manner described in Example I. The product so produced will be highly transparent, moistureproof, and exhibit the same initial heat seal value as the composition of Example I. Aging at 95° C. will reduce the heat seal value to 150 in three weeks.

*Example III*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| 4:4′-diamino diphenyl methane | 2 | to a regenerated cellulose sheet in the manner described in Example I. The product so produced will be highly transparent and moistureproof. It will have an initial heat seal of 250 which will, upon aging at 95° C., drop to 150 in two weeks and remains at that value for over four weeks more.

*Example IV*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| 4:4′-diamino diphenyl methane | 3 | to a regenerated cellulose sheet in the manner described in Example I. The product so produced will be highly transparent, moistureproof, and exhibit good heat seal characteristics.

*Example V*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| N:N′-dimethyl-N:N′ - diethyl - 4:4′ - diamino diphenyl methane | 2 | to a regenerated cellulose sheet in the manner described in Example I. The product so produced will be highly transparent, moistureproof, and exhibit a good initial heat seal of 250 which will, upon aging at 95° C., drop slowly to 130 in four weeks, and hold that value for at least two more weeks.

*Example VI*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| 4:4′-diamino diphenyl | 3 | to a regenerated cellulose sheet in the manner described in Example I. The product so produced will be highly transparent and moistureproof. It will have an initial heat seal value of 300 which will, upon aging at 95° C., drop only to 140 in four weeks.

*Example VII*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| N:N:N':N' - tetramethyl - 4:4' - diamino diphenyl methane | 3 | to a regenerated cellulose sheet in the manner described in Example I. The product so produced will be highly transparent, moistureproof, and exhibit good heat seal characteristics.

*Example VIII*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| N:N:N':N' - tetraethyl - 4:4' - diamino diphenyl methane | 3 | to a regenerated cellulose sheet in the manner described in Example I. The product so produced will be highly transparent, moistureproof, and exhibit good heat seal.

*Example IX*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| Tetramethyl - diamino - benzhydrol | 2 | to a sheet of regenerated cellulose in the manner described in Example I. The product produced in this manner will be highly transparent, moistureproof, and exhibit an initial heat seal of 250, which during aging at 95° C. drops only to 130 in six weeks.

*Example X*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| N:N:N':N' - tetraethyl - 4:4' - diamino diphenyl methane | 10 | to a regenerated cellulose sheet in the manner described in Example I. The product so produced will be highly transparent, moistureproof, and exhibit good heat seal.

*Example XI*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| N:N:N':N' - tetramethyl - 4:4' - diamino diphenyl methane | 15 | to a regenerated cellulose sheet in the manner described in Example I. The product so produced will be highly transparent, moistureproof, and exhibit good heat seal.

*Example XII*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| 4:4'-diamino-diphenyl ether | 3 | to a sheet of regenerated cellulose in the manner described in Example I. The resultant product will be highly transparent, moistureproof, and exhibit good heat seal.

*Example XIII*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| 2:4 - diamino - diphenyl - amine | 3 | to a sheet of regenerated cellulose in the manner described in Example I. The resultant product will be highly transparent, moistureproof and exhibit good heat seal.

*Example XIV*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| 4:4'-diamino-benzophenone | 3 | to a sheet of regenerated cellulose in the manner described in Example I. The resultant product will be highly transparent, moistureproof, and exhibit good heat seal.

*Example XV*

Apply a moistureproofing coating consisting of:

| | Parts |
|---|---|
| Iratol (Ex. X, U. S. A. P. 2,158,530) | 90 |
| Paraffin wax (M. P. 60° C.) | 10 |
| Di(p-ethoxyphenylamino)ethane | 2 | to a sheet of regenerated cellulose in the manner described in Example I. The product produced in this manner will be highly transparent, moistureproof, and exhibit good heat seal.

Preferably the addition materials are from the group consisting of N:N:N':N'-tetraethyl-4:4'-diamino - diphenyl - methane, N:N:N':N'-tetramethyl - 4:4'-diamino-diphenyl-methane, N:N'-dimethyl-N:N'-diethyl-4:4'-diamino - diphenylmethane, 4:4'-diamino-diphenyl-methane, 4:4'-diamino-diphenyl, N:N:N':N'-tetramethyl-4:4'-diamino-diphenyl, N:N:N':N'-tetraethyl-4:4'-diamino-diphenyl, N:N'-dimethyl - N:N' - diethyl-4:4' - diamino - diphenyl, N:N-dimethyl-4:4'-diamino-diphenyl, N:N-dimethyl-4:4'-diamino-diphenyl - methane, N:N-diethyl-4:4'-diamino-diphenyl - methane, tetramethyl-diamino-benzhydrol, di(p-ethoxyphenylamino)-ethane, 4:4'-diamino - benzophenone, 2:4 - diamino - diphenylamine, 4:4'-diamino-diphenyl ether, 4:4'-diamino-diphenyl-ethane, N:N:N':N'-tetramethyl-4:4' - diamino - diphenyl - ethane, 3:3'-diaminobenzophenone, N:N:N':N' - tetraethyl - 4:4'-diamino - diphenyl - ethane, tetramethyl-diamino-benzophenone, tetraethyl-diamino-benzophenone, tetramethyl benzidine, 4:4' - tetramethyl - diamino-triphenyl-methane, N:N'-dimethyl-N:N'-diethyl - 4:4'-diamino-diphenyl-ethane, 4:4'-diamino-diphenyl-amine, N:N' - tetramethyl-4:4'-diamino-diphenyl-amine, and N:N-tetramethyl-4:4'-diamino-diphenyl ether.

Iratol is obtained when rubber is worked on a rubber mill (or related apparatus such as a Banbury mixer) with about 5% to 55% of its weight of beta naphthol (or similar monohydric phenol which contains no substituents other than halogen and hydrocarbon radicals) in the presence of a small amount of a special catalyst, for example, dihydroxy-fluoroboric acid or sulfuric acid, for about 15 minutes at 100° C. The material is quite unlike rubber and the heretofore known rubber derivatives, as will be apparent from a consideration of its chemical and physical properties. The new material being denser, sinks when placed in water, will not adhere to rubber, is more soluble in hydrocarbon solvents than cyclized rubber (J. I. E. C. XXXIII, 389), and when mixed with rubber on a mill and the mixture made into a thin cement, layers off. It seems to be an alkylated phenol (rubber being the alkylating agent), since it is not possible to remove the phenol from the milled product (indicating that the phenol molecule has chemically combined with the rubber molecule). Presumably a combination has taken place at what was an unsaturated carbon atom in the rubber used as a starting material.

The preparation of the iratol is described in U. S. A. Patent 2,158,530 (Williams), and in the interest of brevity reference is made thereto for details. As pointed out by the patentee, iratol is resinous, thermoplastic, benzene soluble, contains 1% to 5% of the phenol chemically combined with the rubber, is resistant to acids and alkalies, does not adhere to rubber, has an impact strength similar to phenol aldehyde resins, imparts a hardness to rubber (when compounded therewith) like glue and Montan wax, and can be hydrogenated at temperatures in the range 80°–200° C. in the presence of an acidic catalyst.

For convenience it may be pointed out that the amount of phenolic material (phenol, naphthol, etc.) may vary widely. It is sometimes preferable to use an excess of the phenolic material, that is, more than will chemically combine with the rubber, and although such a reaction product may be employed, it is preferred that the uncombined excess be removed, for example, by abstraction from the phenol derivative of the rubber. Ordinary extraction procedures utilizing such materials as alcohol solvents, such as ethanol and butanol, are suitable for this purpose. The reaction product may also be purified by dissolving in toluene and precipitating the reaction product with ethyl alcohol (which retains the uncombined phenolic body in solution). The materials used in the specific examples were treated to remove the uncombined phenol.

Generally the products prepared by milling 5 to 20 parts of beta naphthol with 100 parts of rubber in the presence of 4 parts sulfuric acid as a catalyst, are preferred. Although this type of material was employed in the specific examples, it is to be understood that any one or a plurality of the products disclosed in said patent may be employed when desired.

Various phenols in addition to the beta naphthol of the examples, for instance, hydroxy benzene, chlorophenol, cresol and dihydroxy-diphenyl, may be employed in the manufacture of the iratol. One or more phenolic materials may be used in carrying out the reaction. Catalysts other than the sulfuric acid, for example, dihydroxy-fluoro-boric acid, organic sulfonic acids, hydroxy-fluoro-boric acid, and boron trifluoride, may be employed.

The term "iratol" applies only to the type of material obtained according to the aforementioned U. S. A. Patent 2,158,530 and is not to be construed broadly enough to cover isomers or like derivatives of rubber which might be obtained by using phenol or phenol sulfonic acid in a simple catalytic capacity.

As the moistureproofing agent, any wax (used generically to include waxy or wax-like substances like paraffin wax, as well as true waxes which are monohydric alcohol esters of higher fatty acids) or mixture of waxes, may be employed. Ordinarily paraffin wax melting above 50° C., or better, that melting at 60° C. (and above), is preferred.

The new cementing agent compositions are especially useful in coating compositions applied to transparent, smooth, substantially non-porous, non-fibrous sheet, such as those composed of cellulosic material, for example, regenerated cellulose, ethyl cellulose and cellulose acetate; albuminous material, for example, gelatin and casein; and polyvinyl compounds, for example, polyvinyl alcohols and polyvinyl acetals. Water sensitive sheet obtained by coagulation or precipitation and/or regeneration from aqueous (or aqueous alkaline, for example, alkali metal hydroxide and the like) dispersions (or solutions), for example, viscose, cuprammonium and like regenerated cellulose, polyvinyl alcohol, low (lowly) substituted (less than one mol per glucose unit) cellulose ethers (U. S. A. Patent 2,123,880 to Ellsworth), such as glycol cellulose, cellulose glycolic acid, alkyl (methyl, ethyl, etc.) cellulose, and the like, are especially satisfactorily coated with the moistureproofing compositions of this invention.

As indicated above, the presence of the new iratol combinations or compositions also improves coating compositions used on organic solvent soluble compounds like cellulose ethers, for example, ethyl cellulose, and cellulose esters, for example, cellulose acetate. The same is true with paper, modified paper, lowly esterified cellulose, etc.

The new compounds can also be used to coat fabrics, to prepare molding materials, to act as cementing (binding) agents in protective coatings for wood, metal, etc., as adhesives, and for numerous other purposes. These compositions also serve admirably as adhesives in the lamination of sheet material, for example, regenerated cellulose, cellulose derivatives of the same or different kinds, regenerated cellulose to paper, etc., especially when a moistureproof product is desired.

The diamino diphenyl methanes and benzhydrols may be introduced into the iratol or compositions containing the same, in any desired manner. Ordinarily the incorporation is made by the use of a mutual solvent or by milling, but grinding, kneading, and other conventional mixing procedures are satisfactory.

The stabilizing effect of the diamino diphenyl methanes and like additive materials is roughly proportional to the amount used in or with the iratol. The practical limits are from 0.03 to 0.5 per part (3%–50%) of iratol. Improvement obtained by using amounts below the aforementioned lower limit is detectable but not great enough to be of practical value, and no advantage seems to be afforded by using proportions greater than the aforementioned upper limit. Preferably 3% to 15% is employed.

In the preferred procedures, moistureproofing coatings are applied by passing the base sheet through a bath (solution) containing the coating composition but spraying a corresponding solution on the base sheet, and the other schemes known to the art, particularly that listed elsewhere herein, can be used satisfactorily.

The properties of the new iratol compositions may be enhanced and modified in known ways, by the incorporation of minor proportions of other materials. Details of the conventional modifying practices such as dyeing, pigmenting, plasticizing (or softening), transparentizing, and like procedures and materials used therein, are well known and are disclosed in the patents listed elsewhere herein. Reference is made thereto for specific details. Beneficial results are frequently brought about by incorporating natural and/or synthetic resins.

Moistureproofness, moistureproofing and moisture-proof materials and expressions are defined in U. S. A. Patent 2,147,180 (Ubben). In the interest of brevity the definitions are not repeated here. The terms and expressions related thereto and employed herein are used in accordance with such definitions.

Heat seal bond and heat seal bond strength are defined and a standard test for their determination is given in U. S. A. Patent No. 2,147,180 (Ubben). In the interest of brevity the definitions are not repeated here. The terms and expressions related thereto and employed herein are used in accordance with such definitions and description.

Many of the advantages of the present invention are believed apparent from the foregoing part of the specification. The compositions containing iratol, and the iratol itself, are stabilized for long periods of time, extending the useful life many times over, even under conditions involving high temperatures and/or strong light.

The iratol-diamino diphenyl methane cementing agent material makes it possible to produce moisture-proof products which retain their desirable properties (heat seal, color, etc.) over an unexpectedly long period of time.

As many apparently widely different embodiments of this invention may be made without departing from the spirit and scope thereof, it is to be understood that this invention is not limited to the specific embodiments thereof except as defined in the appended claims.

I claim:
1. An article of manufacture comprising a base formed of a sheet of flexible, non-moisture-proof, non-fibrous and transparent material coated with a moistureproofing composition comprising a film-forming substance and a moisture-proofing wax in proportions and of a thickness to produce a transparent moisture-proof product, said film-forming substance being a reaction product of rubber and a phenol containing 1% to 5% of the phenol chemically combined with the rubber, which is resinous, thermoplastic, benzene soluble, acid resistant, alkali resistant, which does not adhere to rubber, which has an impact strength similar to phenol aldehyde resins, and which imparts a hardness to rubber, like glue, said film-forming substance having incorporated therein from 0.5% to 50% (based on the film-forming substance) of a compound having the formula

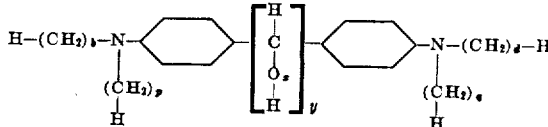

in which $b$, $d$, $p$ and $q$ are numerals from the groups consisting of 0, 1 and 2, and $x$ and $y$ are numerals from the group consisting of 0 and 1, said wax constituting not more than 10% by weight of said composition.

2. An article of manufacture according to claim 1 wherein the compound is N:N:N':N'-tetramethyl-4:'-diamino diphenyl methane.

3. An article of manufacture according to claim 1 wherein the compound is N:N:N':N'-tetraethyl-4:4'-diamino diphenyl methane.

4. An article of manufacture according to claim 1 wherein the compound is 4:4'-diaminodiphenyl methane.

JAMES A. MITCHELL.

REFERENCES CITED

The following references are of record in the file of this patent:

UNITED STATES PATENTS

| Number | Name | Date |
|---|---|---|
| 1,787,064 | Calcott et al. | Dec. 30, 1930 |
| 1,954,377 | Calcott et al. | Apr. 10, 1934 |
| 2,158,530 | Williams | May 16, 1939 |
| 2,203,597 | Morse et al. | June 4, 1940 |
| 2,209,965 | Finzel | Aug. 6, 1940 |
| 2,233,576 | Balon | Mar. 4, 1941 |
| 2,230,359 | McKenzie | Feb. 4, 1941 |
| 2,306,487 | Mitchell | Dec. 29, 1942 |
| 2,321,764 | Mitchell | June 15, 1943 |

---

Certificate of Correction

Patent No. 2,430,726.  November 11, 1947.

JAMES A. MITCHELL

It is hereby certified that error appears in the printed specification of the above numbered patent requiring correction as follows: Column 10, line 25, claim 2, for "methyl-4:'" read *methyl-4 : 4'*; and that the said Letters Patent should be read with this correction therein that the same may conform to the record of the case in the Patent Office.

Signed and sealed this 20th day of January, A. D. 1948.

[SEAL]

THOMAS F. MURPHY,
*Assistant Commissioner of Patents.* ticizing (or softening), transparentizing, and like procedures and materials used therein, are well known and are disclosed in the patents listed elsewhere herein. Reference is made thereto for specific details. Beneficial results are frequently brought about by incorporating natural and/or synthetic resins.

Moistureproofness, moistureproofing and moisture-proof materials and expressions are defined in U. S. A. Patent 2,147,180 (Ubben). In the interest of brevity the definitions are not repeated here. The terms and expressions related thereto and employed herein are used in accordance with such definitions.

Heat seal bond and heat seal bond strength are defined and a standard test for their determination is given in U. S. A. Patent No. 2,147,180 (Ubben). In the interest of brevity the definitions are not repeated here. The terms and expressions related thereto and employed herein are used in accordance with such definitions and description.

Many of the advantages of the present invention are believed apparent from the foregoing part of the specification. The compositions containing iratol, and the iratol itself, are stabilized for long periods of time, extending the useful life many times over, even under conditions involving high temperatures and/or strong light.

The iratol-diamino diphenyl methane cementing agent material makes it possible to produce moisture-proof products which retain their desirable properties (heat seal, color, etc.) over an unexpectedly long period of time.

As many apparently widely different embodiments of this invention may be made without departing from the spirit and scope thereof, it is to be understood that this invention is not limited to the specific embodiments thereof except as defined in the appended claims.

I claim:

1. An article of manufacture comprising a base formed of a sheet of flexible, non-moisture-proof, non-fibrous and transparent material coated with a moistureproofing composition comprising a film-forming substance and a moisture-proofing wax in proportions and of a thickness to produce a transparent moisture-proof product, said film-forming substance being a reaction product of rubber and a phenol containing 1% to 5% of the phenol chemically combined with the rubber, which is resinous, thermoplastic, benzene soluble, acid resistant, alkali resistant, which does not adhere to rubber, which has an impact strength similar to phenol aldehyde resins, and which imparts a hardness to rubber, like glue, said film-forming substance having incorporated therein from 0.5% to 50% (based on the film-forming substance) of a compound having the formula

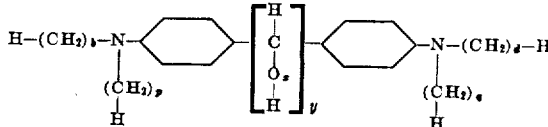

in which $b$, $d$, $p$ and $q$ are numerals from the groups consisting of 0, 1 and 2, and $x$ and $y$ are numerals from the group consisting of 0 and 1, said wax constituting not more than 10% by weight of said composition.

2. An article of manufacture according to claim 1 wherein the compound is N:N:N':N'-tetramethyl-4:'-diamino diphenyl methane.

3. An article of manufacture according to claim 1 wherein the compound is N:N:N':N'-tetraethyl-4:4'-diamino diphenyl methane.

4. An article of manufacture according to claim 1 wherein the compound is 4:4'-diaminodiphenyl methane.

JAMES A. MITCHELL.

REFERENCES CITED

The following references are of record in the file of this patent:

UNITED STATES PATENTS

| Number | Name | Date |
|---|---|---|
| 1,787,064 | Calcott et al. | Dec. 30, 1930 |
| 1,954,377 | Calcott et al. | Apr. 10, 1934 |
| 2,158,530 | Williams | May 16, 1939 |
| 2,203,597 | Morse et al. | June 4, 1940 |
| 2,209,965 | Finzel | Aug. 6, 1940 |
| 2,233,576 | Balon | Mar. 4, 1941 |
| 2,230,359 | McKenzie | Feb. 4, 1941 |
| 2,306,487 | Mitchell | Dec. 29, 1942 |
| 2,321,764 | Mitchell | June 15, 1943 |

---

Certificate of Correction

Patent No. 2,430,726.　　　　　　　　　　　　　　　November 11, 1947.

JAMES A. MITCHELL

It is hereby certified that error appears in the printed specification of the above numbered patent requiring correction as follows: Column 10, line 25, claim 2, for "methyl-4:'" read *methyl-4 : 4'*; and that the said Letters Patent should be read with this correction therein that the same may conform to the record of the case in the Patent Office.

Signed and sealed this 20th day of January, A. D. 1948.

[SEAL]

THOMAS F. MURPHY,
*Assistant Commissioner of Patents.*